(12) United States Patent
Zielinsky

(10) Patent No.: US 9,800,988 B2
(45) Date of Patent: Oct. 24, 2017

(54) PRODUCTION OF 3D AUDIO SIGNALS

(71) Applicant: Sennheiser electronic GmbH & Co. KG, Wedemark (DE)

(72) Inventor: Gregor Zielinsky, Hannover (DE)

(73) Assignee: Sennheiser electronic GmbH & Co. KG, Wedemark (DE)

(*) Notice: Subject to any disclaimer, the term of this patent is extended or adjusted under 35 U.S.C. 154(b) by 0 days.

(21) Appl. No.: 14/758,148

(22) PCT Filed: Dec. 19, 2013

(86) PCT No.: PCT/EP2013/077293
§ 371 (c)(1),
(2) Date: Jun. 26, 2015

(87) PCT Pub. No.: WO2014/102129
PCT Pub. Date: Jul. 3, 2014

(65) Prior Publication Data
US 2015/0326988 A1    Nov. 12, 2015

(30) Foreign Application Priority Data

Dec. 27, 2012  (DE) .................. 10 2012 224 454

(51) Int. Cl.
*H04S 7/00* (2006.01)
*G06F 3/16* (2006.01)
*H04S 5/00* (2006.01)
*H04S 5/02* (2006.01)

(52) U.S. Cl.
CPC ............... *H04S 7/30* (2013.01); *G06F 3/165* (2013.01); *H04S 5/005* (2013.01); *H04S 5/02* (2013.01); *H04S 2420/01* (2013.01)

(58) Field of Classification Search
CPC ....... H04S 2400/01; H04S 3/008; H04S 7/302
USPC .................... 381/61, 103, 119, 307
See application file for complete search history.

(56) References Cited

U.S. PATENT DOCUMENTS

2004/0190727 A1    9/2004  Bacon

FOREIGN PATENT DOCUMENTS

EP          1240805         9/2009

OTHER PUBLICATIONS

International Search Report for PCT/EP2013/077293 dated Oct. 2, 2014.
Guenther et al, "Principles in Surround Recordings with Height", AES Convention 130; May 2011, XP040567418.
Gregory Pallone, "Description of Orange's 3D listening room and contents", 101. MPEG Meeting; Jul. 16, 2012-Jul. 20, 2012; Stockholm; (Motion Picture Expert Group or ISO/IEC JTC1/SC29/WG11), No. m25964, Jul. 11, 2012, XP030054299.
(Continued)

*Primary Examiner* — Md S Elahee
(74) *Attorney, Agent, or Firm* — Haug Partners LLP

(57) ABSTRACT

A device which produces the necessary directional audio signals for a 3-dimensional audio playback and which in that case uses as input signals the available channels of an audio recording intended for 2-dimensional audio playback. By taking psychoacoustic effects into account the desired spatial 3D audio effect is produced by a targeted use of signal delays, frequency-dependent amplitude matchings and a limited use of reverberation effects in conjunction with a targetedly asymmetric processing.

25 Claims, 11 Drawing Sheets

(56) References Cited

OTHER PUBLICATIONS

Auro-3D Creating a new dimension in sound, Oct. 18, 2011, XP055142680, Retrieved from the Internet: URL:http://www.barco.com/projection_systems/downloads/BR_Auro-3D_Oct11_LR.pdf[retrieved on Sep. 25, 2014].
Geoff Martin, "Interchannel Interference at the Listening Position in a Five-channel Loudspeaker Configuration" Audio Engineering Society Convention Paper,Oct. 8, 2002, XP055140480, Retrieved from the Internet: URL:http://www.aes.org/tmpFiles/elib/20140916/11296. pdf [retrieved on Sep. 16, 2014].
Lee et al: "The Relationship Between Interchannel Time and Level Differences in Vertical Sound Localization and Masking", AES Convention 131; Oct. 19, 2011, XP040567630.
Woszczyk et al "Spatial Sound Design Tool for 22.2 Channel 3D Audio Productions, with Height" AES Convention 133, Oct. 2012.
Walther et al, "Direct-Ambient Decomposition and Upmix of Surround Signals", 2011 IEEE Workshop on Application of Signals Processing to Audio and Acoustics, Oct. 2011.

PRODUCTION OF 3D AUDIO SIGNALS

The present application claims priority from PCT Patent Application No. PCT/EP2013/077293 filed on Dec. 19, 2013, which claims priority to German Patent Application No. DE 10 2012 224 454.9 filed on Dec. 27, 2012, the disclosures of which are incorporated herein by reference in their entirety.

FIELD OF THE INVENTION

The present invention concerns a device for the production of 3D audio signals from recordings which are intended for 2D audio playback.

It is noted that citation or identification of any document in this application is not an admission that such document is available as prior art to the present invention.

The recording of audio signals, upon the playback of which a spatial impression is to be afforded, is typically effected by detecting a plurality of directional audio signals which are respectively associated with a spatial direction. In the case of a stereo signal the recording for example comprises a "left" directional audio signal and a "right" directional audio signal. The 5.1 system is also usual, in which five directional audio signals are recorded, which, as seen the point of view of a listener, are associated with the directions "front left", "front right", "front center", "rear left" and "rear right". For that purpose that arrangement uses a subwoofer audio signal whose frequencies are selected so low that the location or direction of playback cannot be perceived by a listener. Further arrangements with a different number of recorded directional audio signals are usual. Such methods in which the directions which are respectively associated with a recorded directional audio signal are all arranged at one height with respect to a listener are referred to in the meantime as 2D audio systems as the directions associated with the individual directional audio signals are all in one plane and the basis thereof is therefore a two-dimensional arrangement.

In the meantime so-called 3D audio systems have been defined as an expansion in relation to 2D audio systems. In that case also a multiplicity of directional audio signals are recorded. Besides the directions in one plane however directional audio signals are here also detected for directions arranged at different heights in relation to the listener. Thus for example in a 3D audio system in the form of a 9.1 system, supplemental to the 5.1 system, directional audio signals are recorded for the directions "front upper left", "front upper right", "rear upper left" and "rear upper right". Taking account of the height has the result that a third dimension in respect of direction is used and thus this constitutes a three-dimensional arrangement, which justifies the designation thereof as a 3D audio system.

EP 1 240 805 B1 shows possible arrangements for 3D audio systems and a method of producing 3D audio recordings which contain the associated number of directional audio signals. Corresponding playback systems are marketed for example under the names "Auro 3D" or "Dolby Pro Logic llz".

In the German application from which priority is claimed the German Patent and Trade Mark Office cited the following documents: LEE, H.: The Relationship Between Inter-channel Time and Level Differences in Vertical Sound Localization and Masking. In: Audio Engineering Society, Convention Paper, Presented at the 131st Convention, 2011 Oct. 20-23, New York, N.Y., USA; WALTHER, A. et al.: Direct-ambient decomposition and upmix of surround signals. In: 2011 IEEE Workshop on Applications of Signal Processing to Audio and Acoustics. Oct. 16-19, 2011; WOSZCZYK, W. et al.: Spatial Enhancement of Audio Recordings. In: Audio Engineering Society, Convention Paper, Presented at the 133rd Convention, 2012 Oct. 26-29, San Francisco, USA.

The problem which arises for the operation of 3D audio playback systems is that most available audio recordings were produced using 2D audio recording technology. Thus the directional audio signals which are necessary for 3D audio playback and which are associated with another height are not included there. In order nonetheless to operate a 3D audio playback system with 2D audio recordings those loudspeakers which are disposed at a different height can for example simply be supplied with a directional audio signal intended for playback in the plane of the listener. The desired spatial 3D audio effect however is not afforded thereby.

In order nonetheless to produce a spatial sound impression the missing directional audio signals can be derived with additional audio processing from the directional audio signals which are present. In the state of the art in that case the spatial impression is generally produced predominantly by the addition of reverberation effects to all directional audio signals. A system which implements that approach is marketed for example under the name "Audyssey". That does in fact give a spatial sound image, but the reverberation produces the impression of a specific room which generally does not correspond to the room in which the user is located. The accentuated use of reverberation can also lead to phase problems, depending on the respective arrangement and room, and that makes itself noticeable by frequency-dependent extinction phenomena or even by comb filter effects. The sound therefore often seems unnatural or even falsified.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112), such that applicant(s) reserve the right to disclaim, and hereby disclose a disclaimer of, any previously described product, method of making the product, or process of using the product.

SUMMARY OF THE INVENTION

An object of the present invention is to convert existing stereo or 5.1 audio signals into a 3D audio playback which is unfalsified and as natural as possible so that a listener has a convincing spatial 3D audio effect.

Thus there is provided a device which uses the available directional audio signals from a 2D audio signal as input signals and which produces therefrom the necessary directional audio signals for a 3D audio playback. The concept of the invention lies in particular in taking account of psychoacoustic effects. The desired spatial 3D audio effect is produced without the disadvantages occurring in the state of the art, by a targeted use of signal delays, frequency-dependent amplitude adaptations and a limited use of reverberation effects in conjunction with a targetedly asymmetric processing.

In an aspect of the present invention the device has at least two inputs for receiving input signals and at least nine outputs for the output of directional audio signals which from the point of view of a listener are associated with the directions "front left", "front right", "front center", "rear left", "rear right", "front upper left", "front upper right", "rear upper left" and "rear upper right". The device further has filters and delay members. The directional audio signals for the directions "front upper" are processed in the device with a high-pass filter, the directional audio signals for the directions "front" are processed with a low-pass filter and the directional audio signals for the directions "rear upper" are processed with an asymmetric stereo reverberation. The delay members serve to produce a time delay in the signals so that the signals are output first "front upper", then with a certain time delay "front", then with a greater time delay "rear" and then with an even greater time delay "rear upper".

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
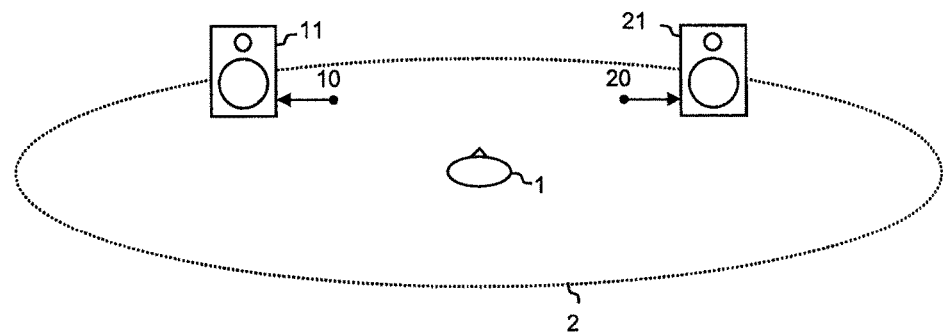
FIG. 1 shows a diagrammatic view of a stereo playback arrangement according to the state of the art.

FIG. 1 shows the diagrammatic view of a stereo playback arrangement according to the state of the art. The listener 1 is in the center. The ellipse 2 denotes the perspective view of a circle, at the center of which the listener 1 is disposed and which defines the plane in which the head of the listener is to be found. A first loudspeaker 11 and a second loudspeaker 21 are disposed in that plane. The arrangement of the loudspeakers, in conjunction with the preferred viewing direction of the listener 1, is such that the first loudspeaker 11 is in the direction "front left" from the listener and the second loudspeaker 21 is in the direction "front right". The first loudspeaker 11 serves for playback of a directional audio signal 10 which in the stereo arrangement shown in FIG. 1 corresponds to the left channel of the stereo audio signal. The second loudspeaker 21 serves for playback of a directional audio signal 20 which in the stereo arrangement shown in FIG. 1 corresponds to the right channel of the stereo audio signal.

Figure 2:
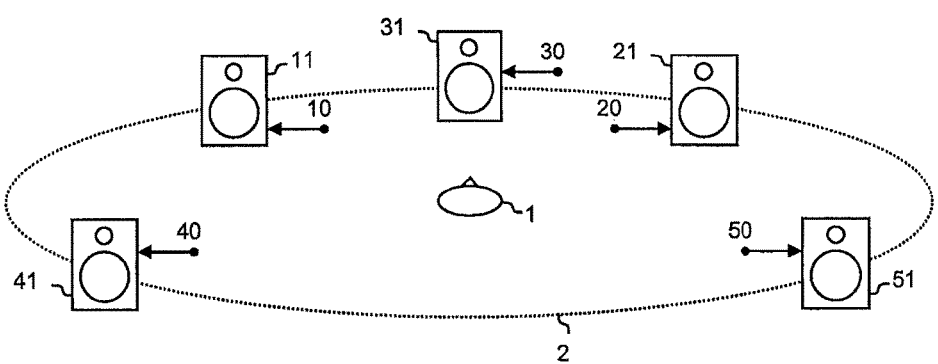
FIG. 2 shows a diagrammatic view of a 5.1 surround playback arrangement according to the state of the art.
Figure 3:
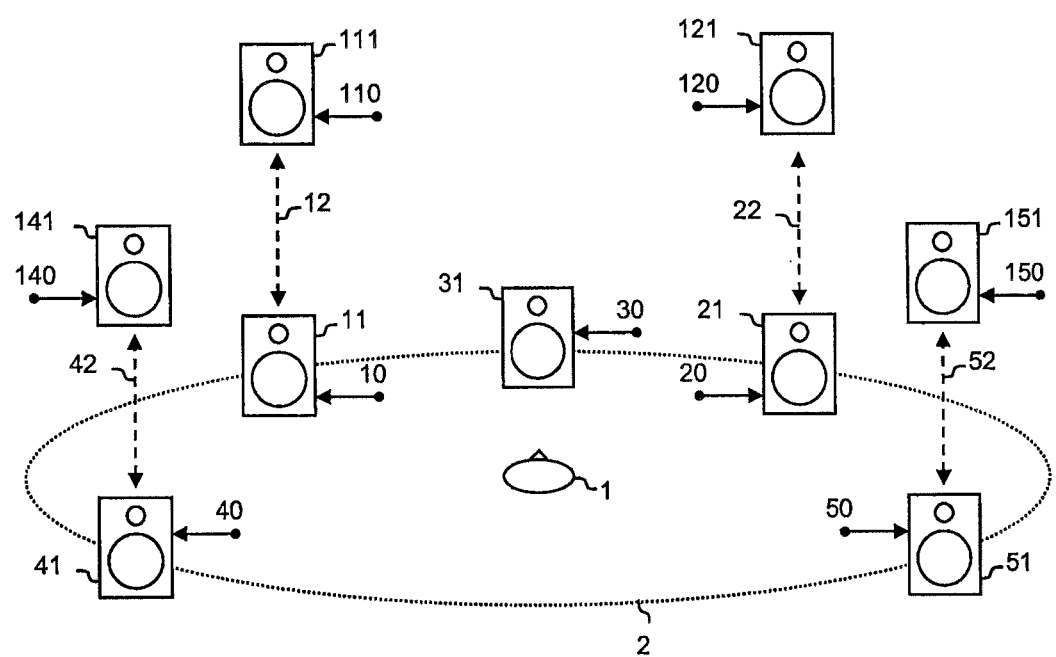
FIG. 3 shows a diagrammatic view of a 9.1 3D audio playback arrangement according to the state of the art.

FIG. 2 shows the diagrammatic view of a 5.1 surround playback arrangement according to the state of the art. All elements of FIG. 1 are also included in this arrangement. In addition a third loudspeaker 31 is disposed in the plane of the listener and is arranged in the direction "front center" as viewed from the listener 1. It serves for playback of a directional audio signal 30 associated with the direction "front center". In addition disposed in the plane of the listener is a further loudspeaker 41 serving for playback of a directional audio signal 40 from the direction "rear left", as well as a fifth loudspeaker 51 serving for playback of a directional audio signal 50 from the direction "rear right". The symbol for a loudspeaker, which is used throughout in FIGS. 1 through 3, is not intended to afford information about the orientation of a loudspeaker, in which the loudspeaker predominantly emits its sound signal. In a real structure the loudspeakers are normally oriented substantially in the direction of the listener 1. The subwoofer additionally provided in a 5.1 surround arrangement is not shown in FIG. 2 as its position and direction is not perceived by the listener by virtue of the frequency limitation of the associated signal.

FIG. 3 shows the diagrammatic view of a 9.1 3D audio playback arrangement according to the state of the art. All elements in FIG. 2 are also included in this arrangement. There are also a plurality of loudspeakers disposed above the plane of the listener. A sixth loudspeaker 111 is arranged at a spacing 12 above the first loudspeaker 11 and serves for playback of a directional audio signal 110 from the direction "front upper left". A seventh loudspeaker 121 is arranged at a spacing 22 above the second loudspeaker 21 and serves for playback of a directional audio signal 120 from the direction "front upper right". An eighth loudspeaker 141 is arranged at a spacing 42 above the fourth loudspeaker 41 and serves for playback of a directional audio signal 140 from the direction "rear upper left". A ninth loudspeaker 151 is arranged at a spacing 52 above the fifth loudspeaker 51 and serves for playback of a directional audio signal 150 from the direction "rear upper right". As in the 5.1 surround arrangement shown in FIG. 2 FIG. 3 also does not show the subwoofer additionally associated with the 9.1 3D audio playback arrangement, for the same reason.

Figure 4:
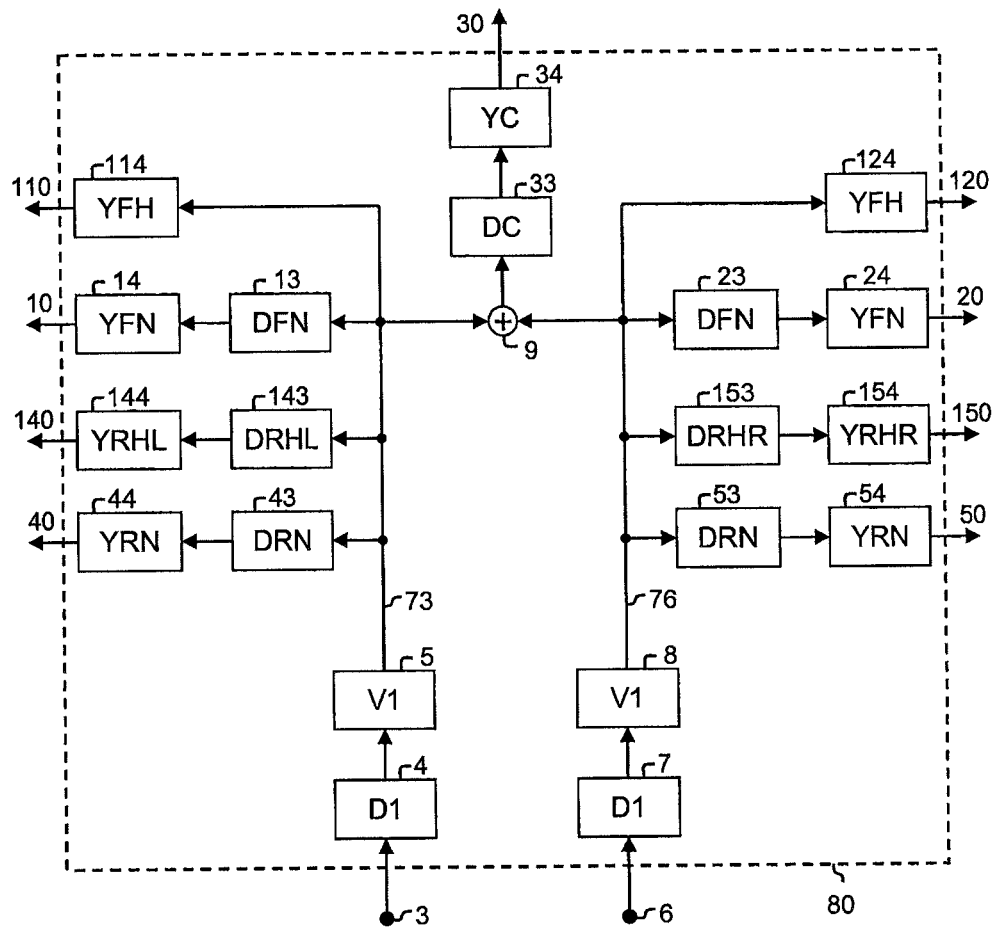
FIG. 4 shows the block circuit diagram of an arrangement for producing the directional audio signals for a 3D audio playback system according to a first embodiment.

FIG. 4 shows the block circuit diagram of an arrangement for producing the directional audio signals for a 3D audio playback system according to a first embodiment. In this embodiment a stereo audio signal serves as the input. In this case a first input signal 3 corresponds to the signal of the left stereo channel and a second input signal 6 corresponds to the signal of the right stereo channel. The 9 directional audio signals 10, 20, 30, 40, 50, 110, 120, 140 and 150 are to be produced from those two input signals. That procedure in which there is produced from a smaller number of input signals a larger number of output signals is referred to as "upmix". Preferably the upmix is performed in a device 80 which receives the available channels from a 2D audio signal as input signals and outputs the 9 directional audio signals 10, 20, 30, 40, 50, 110, 120, 140 and 150. Signal processing in the device 80 is preferably performed digitally. If only a mono audio signal is available then it can be used at the same time both for the input signal 3 and also for the input signal 6.

The first input signal 3 optionally firstly passes through a delay member 4 and is optionally changed in its amplitude by the amplification member 5, an intermediate signal 73 being produced in that case. The second input signal 6 optionally correspondingly first passes through a delay member 7 and is optionally changed in its amplitude by the amplification member 8, an intermediate signal 76 being produced in that way. The delay members 4 and 7 produce the same delay D1. The amplification members 5 and 8 produce the same gain V1. Both the delay members 4 and 7 and also the amplification members 5 and 8 are not required for implementation of the upmix according to the invention. As however the internal signals of the device 80 are normally not available for measurement the presence of those members influences the input/output behavior of the device 80. The signal processing described hereinafter is therefore to be interpreted as meaning that a delay D1 and a gain V1 can be specified so that the transmission behavior provided in accordance with the invention is afforded. Preferably however the delay D1 is of the value 0 ms and the gain V1 is of the value 1 so that the first intermediate signal 73 is identical to the first input signal 3 and the second input signal 76 is identical to the second input signal 6.

The directional output signal 30 ("front center") is produced by summing of the intermediate signal 73 and the intermediate signal 76 at the summing means 9 and by a delay member 33 and a filter 34 arranged in series therewith.

The directional audio signal 110 ("front upper left") is produced from the intermediate signal 73 by way of a filter 114.

The directional audio signal 120 ("front upper right") is produced from the intermediate signal 76 by way of a filter 124.

The directional audio signal 10 ("front left") is produced from the intermediate signal 73 by way of a delay member 13 and a filter 14 arranged in series therewith.

The directional audio signal 20 ("front right") is produced from the intermediate signal 76 by way of a delay member 23 and a filter 24 arranged in series therewith.

The directional audio signal 140 ("rear upper left") is produced from the intermediate signal 73 by way of a delay member 143 and a filter 144 arranged in series therewith.

The directional audio signal 150 ("rear upper right") is produced from the intermediate signal 76 by way of a delay member 153 and a filter 154 arranged in series therewith.

The directional audio signal 40 ("rear left") is produced from the intermediate signal 73 by way of a delay member 43 and a filter 44 arranged in series therewith.

The directional audio signal 50 ("rear right") is produced from the intermediate signal 76 by way of a delay member 53 and a filter 54 arranged in series therewith.

The inventive step lies in the specific configuration of the delay members and filters contained in the device 80. FIGS. 5 through 10 show frequency characteristics of filters in respect of magnitude and phase, which are used in a preferred embodiment according to the invention in the device 80. For the phase response respectively shown in the lower half of FIGS. 5 through 10 the associated filters were standardized in such a way that they react to an input signal different from zero in each case without delay with an output signal different from zero. A delay in the reaction of the filter is therefore not involved in that view. The delays provided in FIG. 4 are thus attributed in this view exclusively to the delay members in the device 80. In a real arrangement however the delays can certainly be implemented as part of a filter. For the configuration according to the invention it is important that the measurable transfer behavior from the respective input signal to the respective output directional audio signal can be represented by a series connection of the delay members and filters involved.

The frequency responses shown in FIGS. 5 through 10 in conjunction with specific values for the delay members are the result of especially adapted upmix algorithms. Those upmix algorithms are based on psychoacoustically acting combinations, not previously used, of predelays, delays, phase-linear filters, tube emulations, multiband compressors, crossover signal routings and minimum reverberation components. To produce an as natural a sound impression as possible the reverberation components are reduced to a degree which is as little perceptible as possible. Minimum predelays provided at a suitable location serve to avoid comb filter effects between the sound signals delivered by the individual loudspeakers. The finished algorithms can be offered in the form of space convolutions. Optionally implementation of the filters can be effected in digital form as FIR filters.

Figure 5:
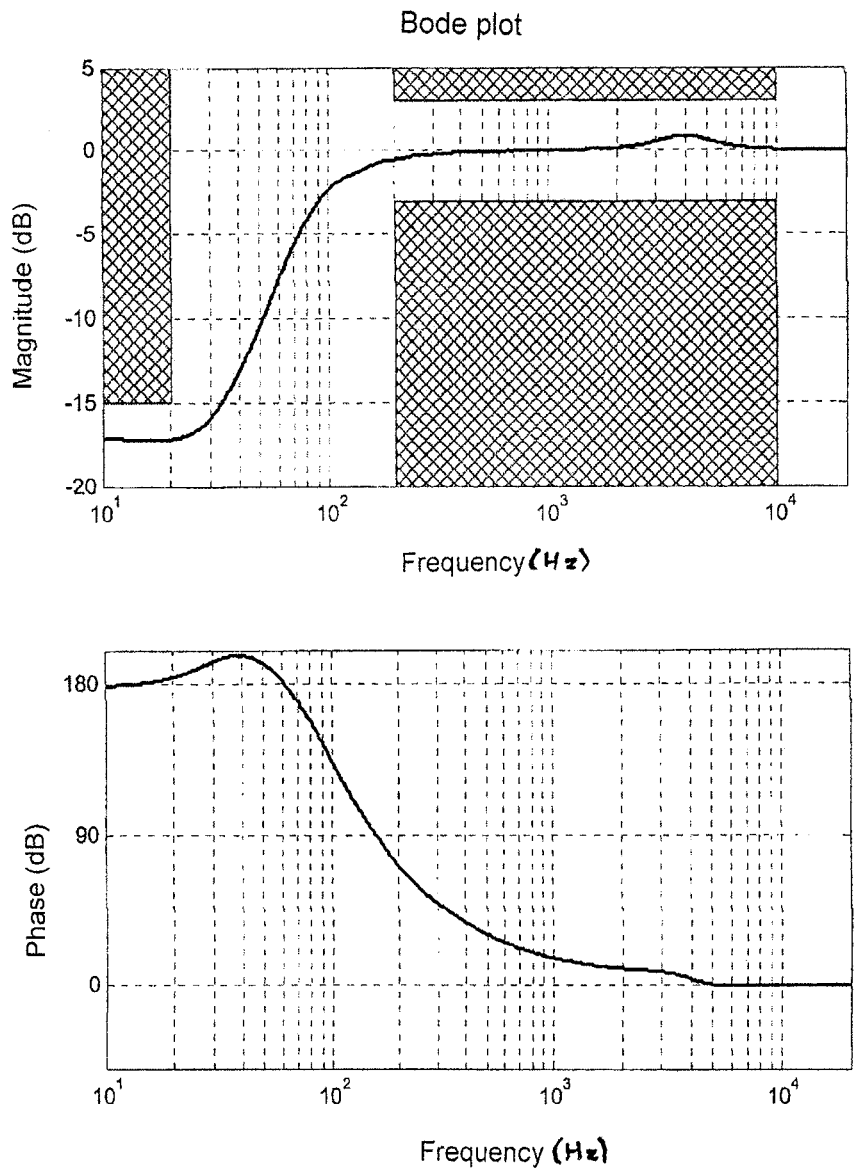
FIG. 5 shows the frequency response of a filter in respect of magnitude and phase, which according to the first embodiment serves to produce a directional audio signal for the "front center" direction.

FIG. 5 shows the frequency response of a filter in respect of magnitude and phase, which according to the first embodiment serves for producing a directional audio signal for the direction "front center". The frequency response shown in FIG. 5 belongs to the filter 34 and describes its transfer function YC. The magnitude configuration shown in relation to frequency shown in the upper half of FIG. 5 shows that frequencies below 20 Hz are attenuated by at least 15 dB. In the frequency range of between 20 Hz and 200 Hz the magnitude rises with increasing frequency. From 200 Hz through to 10 kHz the magnitude is in a range of between −3 dB and +3 dB. Preferably the magnitude in that frequency range is around 0 dB, wherein at a frequency of 4 kHz there is an increase to +1 dB. Overall therefore the filter 34 has a high-pass characteristic, wherein the cutoff frequency is about 100 Hz. The pattern of phase in relation to frequency, shown in the lower half of FIG. 5, approximates to the value 0° for frequencies above 1 kHz, with rising frequency. It will be seen therefrom that the filter 34 does not contain any reverberation components which with rising frequency would lead to a phase configuration tending strongly into the negative range.

The delay member 33 performs a delay DC in the region of between 0.3 ms and 0.6 ms, a preferred value being 0.34 ms.

As the production of the directional audio signal 30 involves summing of the intermediate signal 73 and the intermediate signal 76 at the summing means 9, it should be noted that the sequence of summing, delay and filtering is not fixed. The only crucial consideration is that the two intermediate signals 73 and 76 have passed through the delay and filtering and the directional audio signal 30 corresponds to the sum of the input signals processed in that way.

Figure 6:
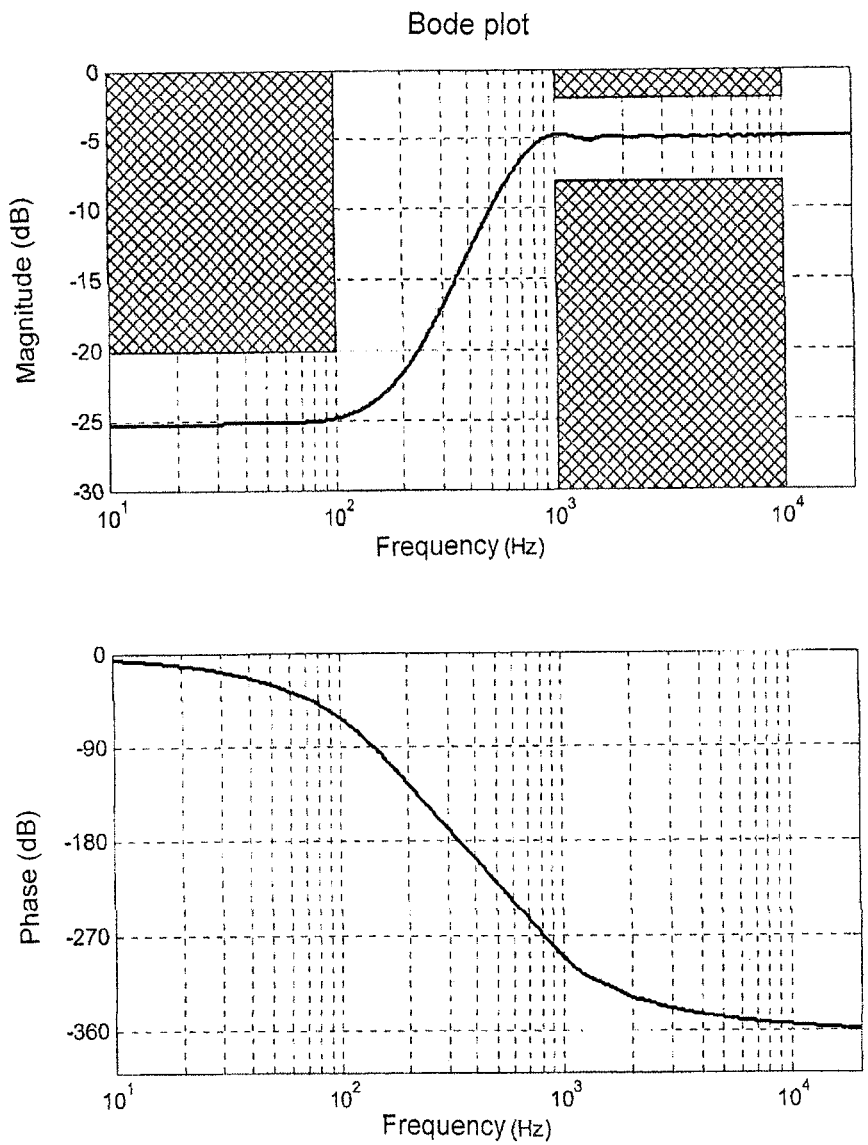
FIG. 6 shows the frequency response of a filter in respect of magnitude and phase, which according to the first embodiment serves to produce a directional audio signal for the direction "front upper left" and "front upper right" respectively.

FIG. 6 shows the frequency response of a filter in respect of magnitude and phase which in accordance with the first embodiment serves to produce a directional audio signal for the direction "front upper left" and "front upper right" respectively. The frequency response shown in FIG. 6 describes a transfer function YFH which is used equally in the filter 114 and in the filter 124. According to the invention therefore production of the directional audio signal 110 from the intermediate signal 73 is effected substantially in accordance with the same transfer function as production of the directional audio signal 120 from the intermediate signal 76. The magnitude configuration in relation to frequency shown in the upper half of FIG. 6 shows that frequencies below 100 Hz are attenuated by at least 20 dB. In the frequency range of between 100 Hz and 1 kHz the magnitude increases with rising frequency. From 1 kHz to 10 kHz the magnitude is in a range of between −8 dB and −2 dB. Preferably the magnitude in that frequency range is around −5 dB. Overall therefore the filters 114 and 124 present a high-pass characteristic, wherein the cutoff frequency is about 600 Hz and an attenuation by about 5 dB is provided in the pass-through region. The configuration of the phase in relation to frequency, shown in the lower half of FIG. 6, which approximates to the value −360° for frequencies above 3 kHz with rising frequency again shows that the filters 114 and 124 do not contain any dominant reverberation components.

It is to be noted that, in the production of the directional audio signal 110 from the intermediate signal 73, no delay member is provided. Thus the delay D1 which is produced by the delay member 4 can be ascertained by means of measurement of the reaction time which elapses from application of a first input signal 3 different from zero to a reaction different from zero on the part of the directional audio signal 110. A delay of the delay member 7, which is correspondingly ascertained from the second input signal 6 and the directional audio signal 120 has in accordance with the invention substantially the same delay value D1. The fact that no dedicated delay member is provided only for the two directional audio signals "front upper" can clearly be interpreted such that the front upper loudspeakers are always supplied with their respective directional audio signal as first loudspeakers, that is to say before all others.

Figure 7:
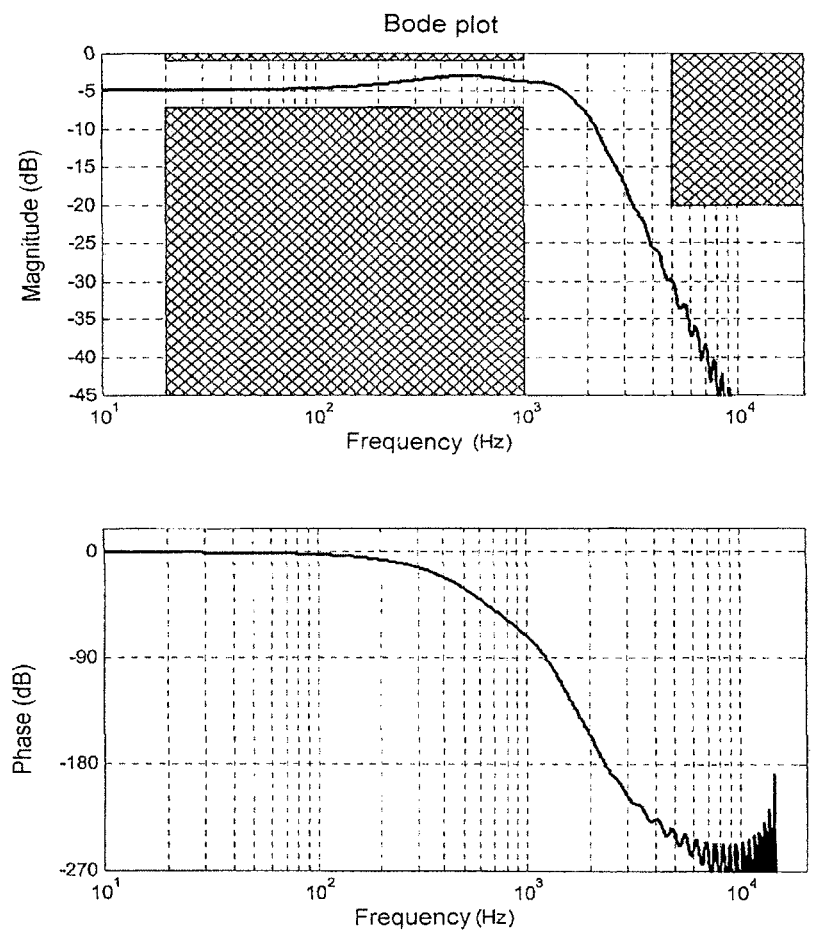
FIG. 7 shows the frequency response of a filter in respect of magnitude and phase, which according to the first embodiment serves to produce a directional audio signal for the direction "front left" and "front right" respectively.

FIG. 7 shows the frequency response of a filter in respect of magnitude and phase which according to the first embodiment serves to produce a directional audio signal for the direction "front left" and "front right" respectively. The frequency response shown in FIG. 7 describes a transfer function YFN which is used equally in the filter 14 and in the filter 24. According to the invention therefore production of the directional audio signal 10 from the intermediate signal 73 is effected substantially in accordance with the same transfer function as production of the directional audio signal 20 from the intermediate signal 76. In accordance with the variation in magnitude shown in relation to frequency in the upper half of FIG. 7 the magnitude is in a range of between −7 dB and −1 dB in a frequency range of between 20 Hz and 1 kHz. Preferably the magnitude in the frequency range up to 100 Hz is around −5 dB and rises to a value of −3 dB in the frequency range around 500 Hz. From about 1.2 kHz the magnitude drops with rising frequency and from a frequency of 5 kHz is below −20 dB. Overall therefore the filters 14 and 24 present a low-pass characteristic, wherein the cutoff frequency is about 1.8 kHz and an attenuation by about 5 dB is provided in the pass-through region. The configuration of the phase in respect of frequency, shown in the lower half of FIG. 7, which above a frequency of 3 kHz has fluctuations in relation to frequency, indicates that a reverberation component can optionally be included. Here too however the reverberation component is not dominant, which finds expression in the fact that the phase is predominantly above −270° at frequencies of up to 10 kHz.

In production of the directional audio signal 10 from the intermediate signal 73 the delay member 13 implements a delay DFN. In the production of the directional audio signal 20 from the intermediate signal 76 the delay member 23 implements a delay which according to the invention has substantially the same delay value DFN. The delay value DFN is in the range of between 0.3 ms and 0.6 ms, a preferred value being 0.45 ms.

Figure 8:
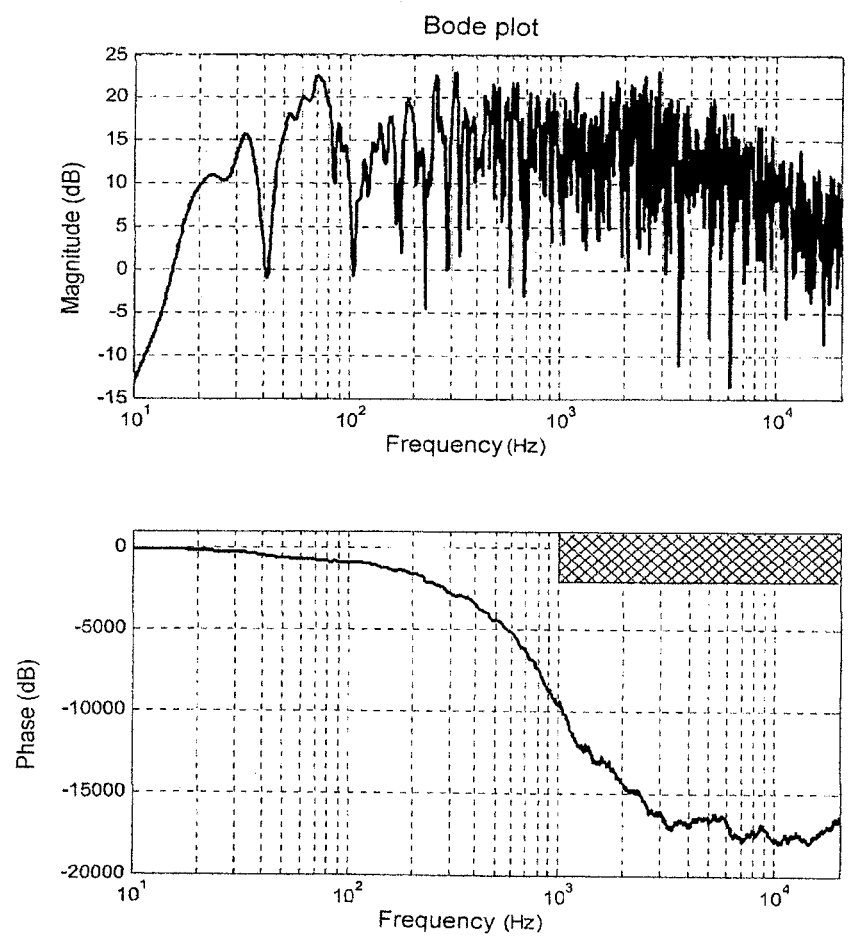
FIG. 8 shows the frequency response of a filter in respect of magnitude and phase, which according to the first embodiment serves to produce a directional audio signal for the direction "rear upper left"

FIG. 8 shows the frequency response of a filter in respect of magnitude and phase which according to the first embodiment serves for the production of a directional audio signal for the direction "rear upper left". The frequency response shown in FIG. 8 describes a transfer function YRHL used in the filter 144. In accordance with the magnitude configuration shown in relation to frequency in the upper half of FIG. 8 the magnitude in a frequency range of between 100 Hz and 1 kHz is predominantly in a range of between −5 dB and +25 dB and in that respect has numerous maxima and minima. That points to a dominant reverberation component. As reverberation is produced by multiple delay and subsequent superpositioning of the delayed signals the typical partial extinctions and superelevations of the output signal, that alternate in relation to frequency, occur. Preferably the magnitude configuration in a frequency range of between 100 Hz and 1 kHz has at least 5 maxima and minima in relation to frequency. The variation in phase in relation to frequency, shown in the lower half of FIG. 8, exhibits a phase below −2000° for frequencies above 1 kHz. That also occurs due to the use of reverberation in which the delayed signal components produce that phase variation.

In production of the directional audio signal 140 from the intermediate signal 73 the delay member 143 produces a delay DRHL. The delay value DRHL is in the range of between 1.1 ms and 1.6 ms, a preferred value being 1.36 ms.

Figure 9:
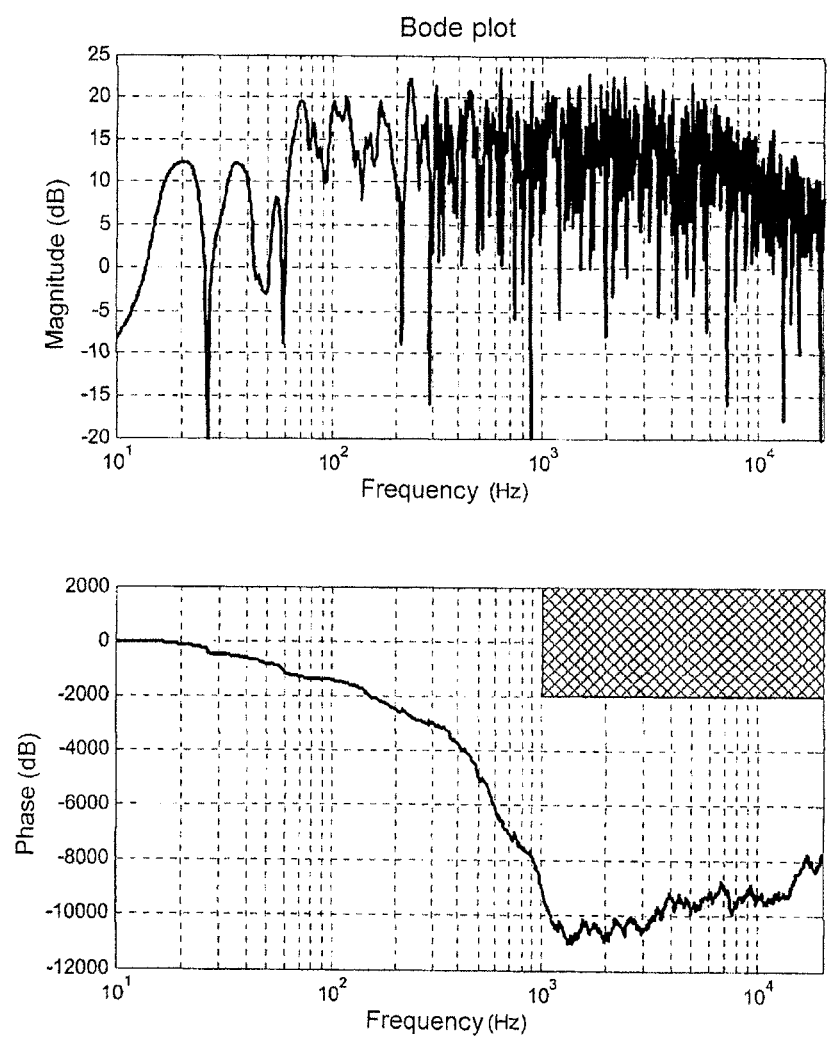
FIG. 9 shows the frequency response of a filter in respect of magnitude and phase, which according to the first embodiment serves to produce a directional audio signal for the direction "rear upper right"

FIG. 9 shows the frequency response of a filter in respect of magnitude and phase which according to the first embodiment serves for production of directional audio signal for the direction "rear upper right". The frequency response shown in FIG. 9 describes a transfer function YRHR used in the filter 154. The relevant properties of the function YRHR substantially correspond to the properties of the function YRHL used in the filter 144. In accordance with the magnitude configuration shown in relation to frequency in the upper half of FIG. 9 the magnitude in a frequency range of between 100 Hz and 1 kHz is predominantly in a range of between −5 dB and +25 dB and in that case has numerous maxima and minima, indicating a dominant reverberation component. Preferably the magnitude configuration in a frequency range of between 100 Hz and 1 kHz has at least 5 maxima and minima in relation to frequency. The variation in phase shown in the lower half of FIG. 9 in relation to frequency exhibits a phase below −2000° for frequencies above 1 kHz. This also occurs due to the use of reverberation.

In production of the directional audio signal 150 from the intermediate signal 76 the delay member 153 produces a delay DRHR. The delay value DRHR is in the range of between 1.1 ms and 1.6 ms, a preferred value being 1.36 ms. The delay value DRHR of the delay member 153 substantially corresponds according to the invention to the delay value DRHL of the delay member 143.

It is to be emphasized however that the transfer function YRHL of the filter 144 differs according to the invention from the transfer function YRHR of the filter 154. This is because a stereo reverberation is used here, which admittedly produces the reverberation effect on both sides in a similar manner by multiple delay and subsequent superpositioning of the delayed signals, but the delay values used in that respect for the transfer function YRHL differ from those of the transfer function YRHR. That finds expression in the frequency responses in FIG. 8 and FIG. 9 in such a form that the magnitude of the transfer functions YRHL and YRHR for individual frequencies differ markedly from each other. For example the magnitude of YRHL in FIG. 8 at 105 Hz exhibits a minimum with an amplitude of about 0 dB while the magnitude of YRHR in FIG. 9 at the same frequency exhibits a maximum of about 19 dB. Preferably there is at least one frequency in the range of between 50 Hz and 1 kHz, at which the magnitude of the transfer function YRHL differs by at least 10 dB from the magnitude of the transfer function YRHR.

The crucial consideration for implementation of the stereo reverberation in the filters 144 and 154 is that the two transfer functions differ from each other in the manner discussed. The specific manifestation of their frequency responses for producing the directional audio signals for the directions "rear upper left" and "rear upper right" can however vary. That means for example that the audio effect produced according to the invention occurs even if the two transfer functions YRHL and YRHR are used in precisely interchanged relationship, that is to say the transfer function YRHL is used in the filter 154 and the transfer function YRHR is used in the filter 144.

Figure 10:
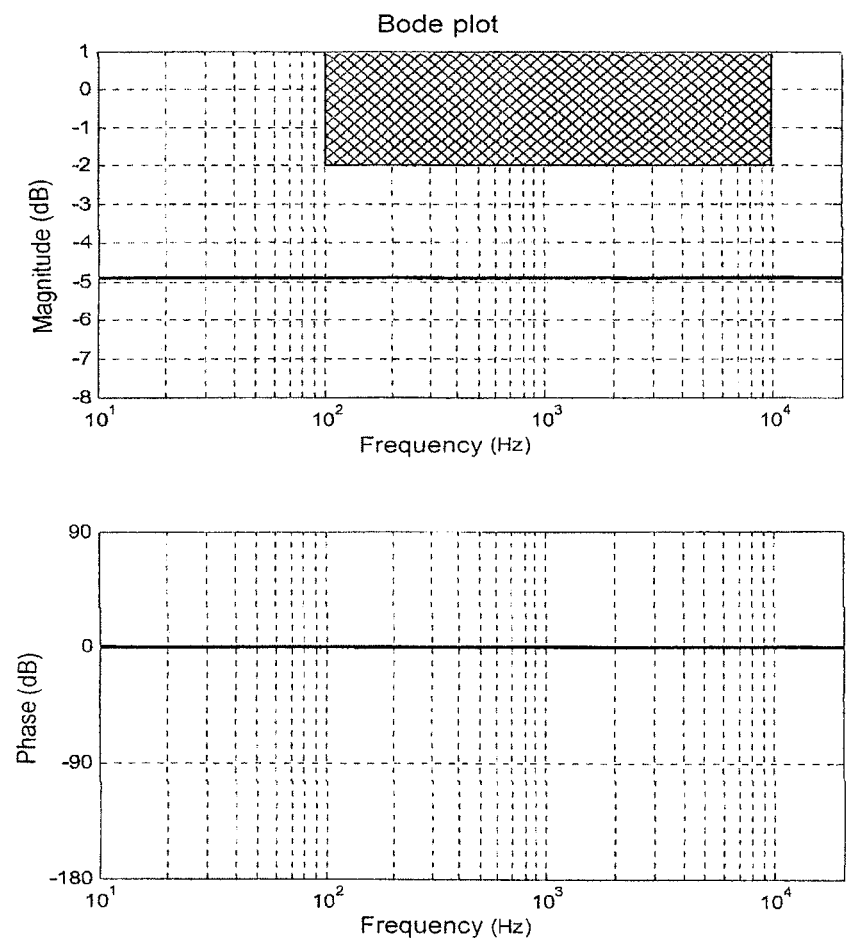
FIG. 10 shows the frequency response of a filter in respect of magnitude and phase, which according to the first embodiment serves to produce a directional audio signal for the direction "rear left" and "rear right" respectively.

FIG. 10 shows the frequency response of a filter in respect of magnitude and phase which according to the first embodiment serves for producing a directional audio signal for the direction "rear left" and "rear right" respectively. The frequency response shown in FIG. 10 describes a transfer function YRN which is used equally in the filter 44 and in the filter 54. According to the invention therefore production of the directional audio signal 40 from the intermediate signal 73 is effected substantially in accordance with the same transfer function as production of the directional audio signal 50 from the intermediate signal 76. In accordance with the magnitude variation shown in relation to frequency in the upper half of FIG. 10 the magnitude of the transfer function YRN for frequencies between 100 Hz and 10 kHz is between −8 dB and −2 dB. Preferably attenuation of the level by about 5 dB is provided in that frequency range. The variation in phase in relation to frequency shown in the lower half of FIG. 10 shows that the phase is substantially 0° in the illustrated frequency range. Noteworthy processing of the signals, that goes beyond the above-mentioned attenuation, is therefore not necessary according to the invention in the filters 44 and 54.

In production of the directional audio signal 40 from the intermediate signal 73 the delay member 43 produces a delay DRN. In production of the audio signal 50 from the intermediate signal 76 the delay member 53 produces a delay which according to the invention is of substantially the same delay value DRN. The delay value DRN is in the range of between 0.6 ms and 1.1 ms, a preferred value being 0.95 ms.

Figure 11:
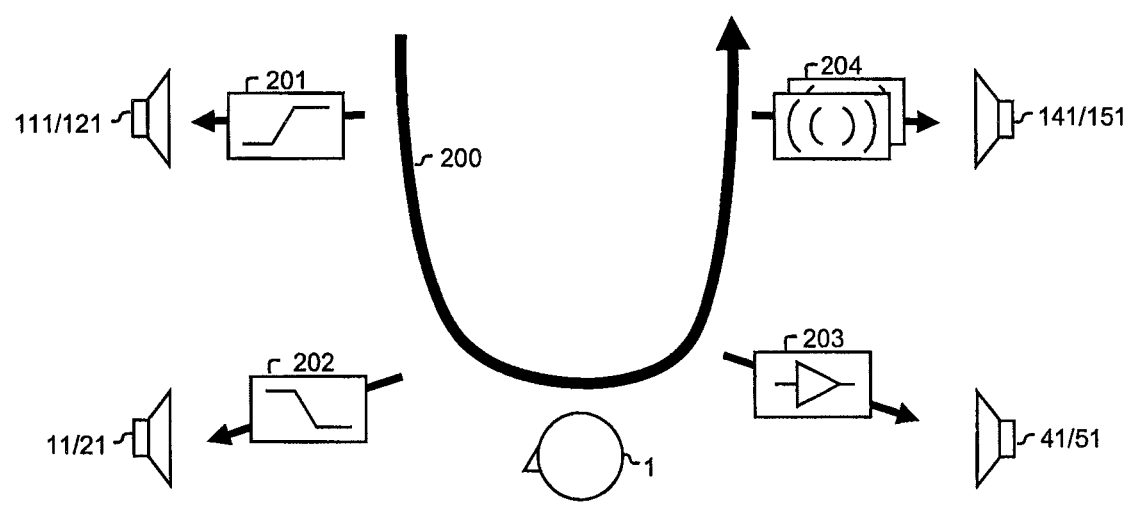
FIG. 11 shows a diagrammatic overview of the procedure in producing the directional audio signals according to the first embodiment.

FIG. 11 shows a diagrammatic overview of the procedure involved in producing the directional audio signals according to the first embodiment. The view serves to show the above-discussed procedure in clear form and to visualize its characteristic properties. In this case the listener 1 is shown from the side so that his viewing direction points "straight ahead" in FIG. 11 in the direction of the left-hand half of the Figure. The loudspeakers 11 and 21 which are at the "front" from the point of view of the listener are therefore shown at bottom left in FIG. 11 and the loudspeakers 111 and 121 which are at "front upper" from the point of view of the listener are shown at top left. Correspondingly the loudspeakers 41 and 51 which are disposed at the "rear" from the point of view of the listener are shown at bottom right and the loudspeakers 141 and 151 which are at "rear upper" from the point of view of the listener are shown at top right. For the loudspeakers 11, 111, 41 and 141 which are on the left-hand side from the point of view of the listener the signal of the left-hand stereo channel is processed as shown in FIG. 4 as an input signal 3 and for the loudspeakers 21, 121, 51 and 151 on the right-hand side from the point of view of the listener that of the right-hand stereo channel is corresponding processed as the input signal 6. The procedure shown in FIG. 11 is then performed in similar fashion for all elements on the left-hand side of the listener and for all elements on the right-hand side.

The arcuate arrow 200 shows the procedure in respect of time which arises out of the delay values of the delay members contained in FIG. 4. The respective input signal first reaches in respect of time the front upper loudspeakers 111/121, with high-pass filtering 201 being implemented. In the second step in respect of time the signal reaches the front loudspeakers 11/21 at the height of the listener, with low-pass filtering 202. The time delay in relation to input of the signal at the front upper loudspeakers 111/121 is in that case of the value DFN and is thus in the range of between 0.3 ms and 0.6 ms. In the third step in respect of time the signal reaches the rear loudspeakers 41/51 at the height of the listener, with optionally matching 203 of the overall level. The time delay in relation to input of the signal at the front upper loudspeakers 111/121 is in that case of the value DRN and is thus in the range of between 0.6 ms and 1.1 ms. In the fourth step in respect of time the signal reaches the rear upper loudspeakers 141/151, wherein asymmetrically implemented reverberation effects 204 are added for the right-hand and left-hand sides. The time delay in relation to input of the signal at the front upper loudspeakers 111/121 is in that case of the value DRHL and DRHR respectively and is thus in the range of between 1.1 ms and 1.6 ms.

Figure 12:
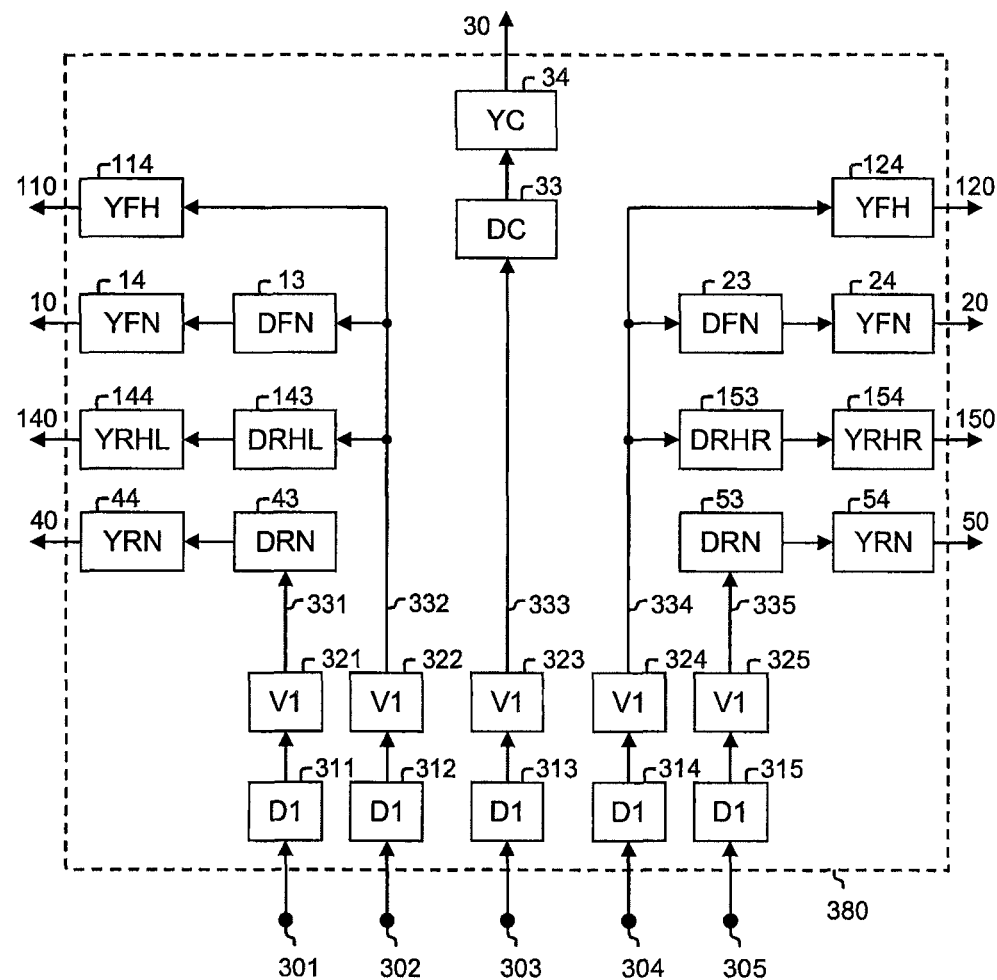
FIG. 12 shows the block circuit diagram of an arrangement for producing the directional audio signals for a 3D audio playback system according to a second embodiment.

FIG. 12 shows the block circuit diagram of an arrangement for producing the directional audio signals for a 3D audio playback system according to a second embodiment. In this second embodiment the 5 channels of a 5.1 surround signal serve as input signals, which in the case of such a signal are associated with the 5 directions in the plane of the listener. In that case a first input signal 301 corresponds to the channel for the direction "rear left", a second input signal 302 corresponds to the channel for the direction "front left", a third input signal 303 corresponds to the channel for the direction "front center", a fourth input signal 304 corresponds to the channel for the direction "front right", and a fifth input signal 305 corresponds to the channel for the direction "rear right". The 9 directional audio signals 10, 20, 30, 40, 50, 110, 120, 140 and 150 are produced from those 5 input signals. Preferably the upmix is performed in a device 380 which receives the available channels from the 2D audio signal as input signals and outputs the 9 directional audio signals 10, 20, 30, 40, 50, 110, 120, 140 and 150. Signal processing in the device 380 is preferably performed digitally.

As already discussed in relation to the stereo input in accordance with the first embodiment of FIG. 4 in this case also the 5 input signals 301, 302, 303, 304 and 305 can optionally firstly pass through a respective delay member 311, 312, 313, 314 and 315. Those delay members all produce the same delay D1. In addition the 5 input signals can optionally be altered in their amplitude by respective amplification members 321, 322, 323, 324 and 325. Those amplification members all produce the same gain V1. In that way 5 intermediate signals 331, 332, 333, 334 and 335 are produced. Both the delay members 311, 312, 313, 314 and 315 and also the amplification members 321, 322, 323, 324 and 325 are not required for implementation of the upmix according to the invention. As however the internal signals of the device 380 are normally not available for measurement the presence of those members influences the input/output behavior of the device 380. Therefore the signal processing described hereinafter is to be interpreted in such a way that a delay D1 and a gain V1 can be specified so that this gives the transfer characteristic provided according to the invention. Preferably however the delay D1 is of the value 0 ms and the gain V1 is of the value 1 so that the intermediate signals 331, 332, 333, 334 and 335 are respectively identical to one of the input signals 301, 302, 303, 304 and 305.

The filters 114, 14, 144, 44, 34, 124, 24, 154 and 54 included in FIG. 12 are identical in their function to the corresponding filters of FIG. 4. The delay members 13, 143, 43, 33, 23, 153 and 53 in FIG. 11 are also identical in their function to the corresponding delay members of FIG. 4. Only the distribution of the 5 input signals present here to the individual filters differs from the first embodiment of FIG. 4 in which only two input signals are available.

The directional audio signal 30 ("front center") is produced according to the second embodiment from the intermediate signal 333 by way of a delay member 33 and a filter 34 arranged in series therewith.

The directional audio signal 110 ("front upper left") is produced in accordance with the second embodiment from the intermediate signal 332 by way of a filter 114.

The directional audio signal 120 ("front upper right") is produced in accordance with the second embodiment from the intermediate signal 334 by way of a filter 124.

The directional audio signal 10 ("front left") is produced in accordance with the second embodiment from the intermediate signal 332 by way of a delay member 13 and a filter 14 arranged in series therewith.

The directional audio signal 120 ("front right") is produced in accordance with the second embodiment from the intermediate signal 334 by way of a delay member 23 and a filter 24 arranged in series therewith.

The directional audio signal 140 ("rear upper left") is produced in accordance with the second embodiment from the intermediate signal 332 by way of a delay member 143 and a filter 144 arranged in series therewith.

The directional audio signal 150 ("rear upper right") is produced in accordance with the second embodiment from the intermediate signal 334 by way of a delay member 153 and a filter 154 arranged in series therewith.

The directional audio signal 40 ("rear left") is produced in accordance with the second embodiment from the intermediate signal 331 by way of a delay member 43 and a filter 44 arranged in series therewith.

The directional audio signal 50 ("rear right") is produced in accordance with the second embodiment from the intermediate signal 335 by way of a delay member 53 and a filter 54 arranged in series therewith.

It is to be noted that the input signal 302 which corresponds to the 5.1 surround channel "front left" serves in the second embodiment as shown in FIG. 12 as the source for the three directional audio signals 10 ("front left"), 110 ("front upper left") and also 140 ("rear upper left"). Correspondingly the input signal 304 corresponding to the 5.1 surround channel "front right" serves in the second embodiment of FIG. 12 as the source for the three directional audio signals 20 ("front right"), 120 ("front upper right") and also 150 ("rear upper right"). Therefore in the second embodiment production of the 6 directional audio signals 10, 110, 140, 20, 120 and 150 is effected precisely in accordance with the same principle as in the first embodiment. The three input signals 301 "rear left", 303 "front center" and 305 "rear right" respectively serve exclusively as the source for the respective directional audio signals 40, 30 and 50, with which the respective direction is also associated in the 5.1 surround arrangement. However processing with the filters and delay members contained in the device 380 is applied to all directional audio signals.

The described upmix method can be used in any environment in which three-dimensional sound playback is possible. Besides domestic audio systems automobile, radio, TV, Blu Ray, studio, etc. systems can thus also be considered as areas of use. Use when playing back image/sound carriers like for example in DVD or BD players is also appropriate. Real time implementation of the above-mentioned effect combination can be afforded for example by means of high-grade computers as well as additional hardware extensions.

According to a further aspect of the invention the described upmix can be activated and deactivated or configured in dependence on the signal to be processed. It is for example not appropriate for a speech signal to be processed by the same upmix method as music. The algorithms used in music upmix are not constantly speech-compatible so that a newscaster would otherwise possibly sound excessively spacious. An apparatus which implements the described upmix can thus include a detector which detects the difference between speech and music and on the basis of the analysis result provides for activation or deactivation of the upmix method. Level and stereo/mono detection as well as filters can be used for analysis of the input signal.

According to a further aspect of the present invention it is possible to vary the transfer characteristic of the included filters to a restricted scope and thus to optimize different upmix filters specifically for different kinds of input signals. Thus for example it is possible to provide various versions of the filters for rock, classical, vocal and so forth. The choice between those versions can either be effected manually by the user or by an analysis of the input signal or by evaluation of corresponding items of additional information contained with the signal. If no information about the nature of the input signal is available a standard version of the filters can be used, which satisfactorily detects any form of music and speech and which is suitable for a standard use like for example for radio or TV reproduction.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A device for producing 3D audio signals from audio recordings intended for 2D audio playback, comprising:
   at least two inputs for receiving a first input signal and at least one second input signal that are intended for 2D audio playback;
   at least nine outputs for the output of directional audio signals that are converted from the first input signal and the second input signal, wherein from the point of view of a listener;
   a first directional audio signal is associated with the direction "front left";
   a second directional audio signal is associated with the direction "front right";
   a third directional audio signal is associated with the direction "front center";
   a fourth directional audio signal is associated with the direction "rear left";
   a fifth directional audio signal is associated with the direction "rear right";
   a sixth directional audio signal is associated with the direction "front upper left";
   a seventh directional audio signal is associated with the direction "front upper right";
   an eighth directional audio signal is associated with the direction "rear upper left"; and
   a ninth directional audio signal is associated with the direction "rear upper right";
   wherein the sixth directional audio signal associated with the direction "front upper left" is produced from the first input signal by filtering with a first filter wherein the first filter has a high-pass characteristic;
   wherein the first directional audio signal associated with the direction "front left" is produced from the first input signal by filtering with a second filter and delay with a first delay member, wherein the second filter has a low-pass characteristic;
   wherein the eighth directional audio signal associated with the direction "rear upper left" is produced from the first input signal by filtering with a third filter and delay with a second delay member, wherein the third filter produces a dominant reverberation component and wherein the second delay member produces a greater delay than the first delay member;
   wherein the seventh directional audio signal associated with the direction "front upper right" is produced from the second input signal by filtering with a fourth filter, wherein the fourth filter has substantially the same transfer characteristic as the first filter;
   wherein the second directional audio signal associated with the direction "front right" is produced from the second input signal by filtering with a fifth filter and delay with a third delay member, wherein the fifth filter has substantially the same transfer characteristic as the second filter and the third delay member produces substantially the same delay as the first delay member; and
   wherein the ninth directional audio signal associated with the direction "rear upper right" is produced from the second input signal by filtering with a sixth filter and delay with a fourth delay member, wherein the sixth filter produces a dominant reverberation component and wherein the transfer characteristic of the sixth filter differs from the transfer characteristic of the third filter so that a stereo reverberation is produced and wherein the fourth delay member produces substantially the same delay as the second delay member.

2. The device as set forth in claim 1;
   wherein the first input signal corresponds to the signal of a left stereo channel and the second input signal corresponds to the signal of a right stereo channel, and
   wherein the fourth directional audio signal associated with the direction "rear left" is produced from the first input signal by filtering with a seventh filter and delay with a fifth delay member;
   wherein the fifth directional audio signal associated with the direction "rear right" is produced from the second input signal by filtering with an eighth filter and delay with a sixth delay member; and
   wherein the third directional audio signal associated with the direction "front center" is produced by summing of the first input signal and the second input signal and by filtering with a ninth filter and delay with a seventh delay member.

3. The device as set forth in claim 1;
   wherein the device has at least five inputs for receiving at least five input signals;
   wherein:
   the first input signal is associated with the direction "front left";
   the second input signal is associated with the direction "front right";
   a third input signal is associated with the direction "front center";
   a fourth input signal is associated with the direction "rear left"; and
   a fifth input signal is associated with the direction "rear right", and wherein the fourth directional audio signal is produced from the fourth input signal by filtering with a seventh filter and delay with a fifth delay member;
   wherein the fifth directional audio signal is produced from the fifth input signal by filtering with a eighth filter and delay with a sixth delay member; and
   wherein the third directional audio signal is produced from the third input signal by filtering with a ninth filter and delay with a seventh delay member.

4. The device as set forth in claim 2;
   wherein the sixth delay member produces substantially the same delay as the fifth delay member and wherein said delay is greater than that of the first delay member but less than that of the second delay member; and
   wherein the eighth filter has substantially the same transfer characteristic as the seventh filter.

5. The device as set forth in claim 2;
   wherein the fifth delay member and the sixth delay member produce a delay in the range of between 0.6 ms and 1.1 ms.

6. The device as set forth in claim 5;
   wherein the seventh delay member produces a delay in the range of between 0.3 ms and 0.6 ms; and
   wherein the ninth filter has a high-pass characteristic.

7. The device as set forth in claim 1;
   wherein the first delay member and the third delay member produce a delay in the range of between 0.3 ms and 0.6 ms so that the first directional audio signal is output delayed by that magnitude in relation to the sixth directional audio signal and the second directional audio signal is output delayed by that magnitude in relation to the seventh directional audio signal.

8. The device as set forth in claim 1;
wherein the second delay member and the fourth delay member produce a delay in the range of between 1.1 ms and 1.6 ms so that the eighth directional audio signal is output delayed by that magnitude in relation to the sixth directional audio signal and the ninth directional audio signal is output delayed by that magnitude in relation to the seventh directional audio signal.

9. The device as set forth in claim 1;
wherein the magnitude of the transfer characteristic of the first filter and the fourth filter for frequencies below 100 Hz is below −20 dB and in the frequency range of between 1 kHz and 10 kHz it is between −8 dB and −2 dB.

10. The device as set forth in claim 1;
wherein the magnitude of the transfer characteristic of the second filter and the fifth filter in the frequency range of between 20 Hz and 1 kHz is between −7 dB and −1 dB and for frequencies above 5 kHz it is below −20 dB.

11. The device as set forth in claim 1;
wherein the magnitude of the transfer characteristic of the third filter and the sixth filter in the frequency range of between 100 Hz and 1 kHz is predominantly in a range of between −5 dB and +25 dB and in that frequency range has a multiplicity of at least 5 maxima and minima in relation to that frequency.

12. The device as set forth in claim 1;
wherein the magnitude of the transfer characteristic of the third filter for at least one frequency in the range of between 50 Hz and 1 kHz differs by at least 10 dB from the magnitude of the transfer characteristic of the sixth filter at the same frequency.

13. A method for producing 3D audio signals from audio recordings intended for 2D audio playback, comprising the steps of:
receiving a first input signal and at least one second input signal that are intended for 2D audio playback;
converting the first input signal and the second input signal into at least nine outputs for the output of directional audio signals, wherein from the point of view of a listener;
associating a first directional audio signal with the direction "front left";
associating a second directional audio signal with the direction "front right";
associating a third directional audio signal with the direction "front center";
associating a fourth directional audio signal with the direction "rear left";
associating a fifth directional audio signal with the direction "rear right";
associating a sixth directional audio signal with the direction "front upper left";
associating a seventh directional audio signal with the direction "front upper right";
associating an eighth directional audio signal with the direction "rear upper left"; and
associating a ninth directional audio signal with the direction "rear upper right";
producing the sixth directional audio signal associated with the direction "front upper" from the first input signal by filtering with a first filter wherein the first filter has a high-pass characteristic;
producing the first directional audio signal associated with the direction "front left" from the first input signal by filtering with a second filter and delay with a first delay member, wherein the second filter has a low-pass characteristic;
producing the eighth directional audio signal associated with the direction "rear upper left" from the first input signal by filtering with a third filter and delay with a second delay member, wherein the third filter produces a dominant reverberation component and wherein the second delay member produces a greater delay than the first delay member;
producing the seventh directional audio signal associated with the direction "front upper right" from the second input signal by filtering with a fourth filter, wherein the fourth filter has substantially the same transfer characteristic as the first filter;
producing the second directional audio signal associated with the direction "front right" from the second input signal by filtering with a fifth filter and delay with a third delay member, wherein the fifth filter has substantially the same transfer characteristic as the second filter and the third delay member produces substantially the same delay as the first delay member; and
producing the ninth directional audio signal associated with the direction "rear upper right" from the second input signal by filtering with a sixth filter and delay with a fourth delay member, wherein the sixth filter produces a dominant reverberation component and wherein the transfer characteristic of the sixth filter differs from the transfer characteristic of the third filter so that a stereo reverberation is produced and wherein the fourth delay member produces substantially the same delay as the second delay member.

14. The method as set forth in claim 13;
wherein the first input signal corresponds to the signal of a left stereo channel and the second input signal corresponds to the signal of a right stereo channel;
wherein the fourth directional audio signal associated with the direction "rear left" is produced from the first input signal by filtering with a seventh filter and delay with a fifth delay member;
wherein the fifth directional audio signal associated with the direction "rear right" is produced from the second input signal by filtering with an eighth filter and delay with a sixth delay member; and
wherein the third directional audio signal associated with the direction "front center" is produced by summing of the first input signal and the second input signal and by filtering with a ninth filter and delay with a seventh delay member.

15. The method as set forth in claim 13, further comprising:
receiving at least five input signals;
wherein the first input signal is associated with the direction "front left";
wherein the second input signal is associated with the direction "front right";
wherein a third input signal is associated with the direction "front center";
wherein a fourth input signal is associated with the direction "rear left";
wherein a fifth input signal is associated with the direction "rear right";
wherein the fourth directional audio signal is produced from the fourth input signal by filtering with a seventh filter and delay with a fifth delay member;

wherein the fifth directional audio signal is produced from the fifth input signal by filtering with a eighth filter and delay with a sixth delay member; and wherein the third directional audio signal is produced from the third input signal by filtering with a ninth filter and delay with a seventh delay member.

16. The method as set forth in claim 14;

wherein the sixth delay member produces substantially the same delay as the fifth delay member and wherein said delay is greater than that of the first delay member but less than that of the second delay member; and wherein the eighth filter has substantially the same transfer characteristic as the seventh filter.

17. The method as set forth in claim 14;

wherein the fifth delay member and the sixth delay member produce a delay in the range of between 0.6 ms and 1.1 ms.

18. The method as set forth in claim 17;

wherein the seventh delay member produces a delay in the range of between 0.3 ms and 0.6 ms; and wherein the ninth filter has a high-pass characteristic.

19. The method as set forth in claim 13;

wherein the first delay member and the third delay member produce a delay in the range of between 0.3 ms and 0.6 ms so that the first directional audio signal is output delayed by that magnitude in relation to the sixth directional audio signal and the second directional audio signal is output delayed by that magnitude in relation to the seventh directional audio signal.

20. The method as set forth in claim 13;

wherein the second delay member and the fourth delay member produce a delay in the range of between 1.1 ms and 1.6 ms so that the eighth directional audio signal is output delayed by that magnitude in relation to the sixth directional audio signal and the ninth directional audio signal is output delayed by that magnitude in relation to the seventh directional audio signal.

21. The method as set forth in claim 13;

wherein the magnitude of the transfer characteristic of the first filter and the fourth filter for frequencies below 100 Hz is below −20 dB and in the frequency range of between 1 kHz and 10 kHz it is between −8 dB and −2 dB.

22. The method as set forth in claim 13;

wherein the magnitude of the transfer characteristic of the second filter (14) and the fifth filter (24) in the frequency range of between 20 Hz and 1 kHz is between −7 dB and −1 dB and for frequencies above 5 kHz it is below −20 dB.

23. The method as set forth in claim 13;

wherein the magnitude of the transfer characteristic of the third filter and the sixth filter in the frequency range of between 100 Hz and 1 kHz is predominantly in a range of between −5 dB and +25 dB and in that frequency range has a multiplicity of at least 5 maxima and minima in relation to that frequency.

24. The method as set forth in claim 13;

wherein the magnitude of the transfer characteristic of the third filter for at least one frequency in the range of between 50 Hz and 1 kHz differs by at least 10 dB from the magnitude of the transfer characteristic of the sixth filter at the same frequency.

25. A 3D audio signal having nine directional signal components as produced by the method of producing 3D audio signals according to claim 13.

* * * * *